United States Patent [19]
Huh et al.

[11] Patent Number: 5,396,612
[45] Date of Patent: Mar. 7, 1995

[54] DATA TRACKING ARRANGEMENT FOR IMPROVING THE QUALITY OF DATA STORED IN A DATABASE

[75] Inventors: Young U. Huh, Naperville, Ill.; Robert W. Pautke, Cincinnati, Ohio; Thomas C. Redman, Rumson, N.J.

[73] Assignee: AT&T Corp., Murray Hill, N.J.

[21] Appl. No.: 694,573

[22] Filed: May 2, 1991

[51] Int. Cl.⁶ .................. G06F 11/34; G06F 3/00; G06F 15/00
[52] U.S. Cl. .................. 395/575; 364/931.4; 364/228.3
[58] Field of Search .......... 395/575; 364/228, 228.3, 364/228.5, 228.7, 931, 931.01, 931.4, 931.43; 371/5.1

[56] References Cited

U.S. PATENT DOCUMENTS

| | | | |
|---|---|---|---|
| 4,432,051 | 2/1984 | Bogaert et al. | 364/200 |
| 4,590,550 | 5/1986 | Eilert et al. | 364/200 |
| 4,751,635 | 6/1988 | Kret | 364/200 |
| 4,849,879 | 7/1989 | Chinnaswamy et al. | 364/200 |
| 5,065,311 | 11/1981 | Masai et al. | 364/200 |
| 5,204,956 | 4/1993 | Danuser et al. | 395/575 |
| 5,226,148 | 7/1993 | Littlewood | 395/575 |

*Primary Examiner*—Robert W. Beausoliel, Jr.
*Assistant Examiner*—T. Tu
*Attorney, Agent, or Firm*—Frederick R. Luludis

[57] ABSTRACT

A facility is provided for improving the quality of data that is stored in a data base. Such improved quality is achieved by tracking the operation of various processes controlling respective data processors, which assemble/modify a data record that is ultimately stored in the data base such that random ones of the data records are marked prior to supplying them to a first one of the processors and then obtaining from each of the processors a copy of a marked data record that it processes. Copies of respective data records are then analyzed to determine which of the processes may be corrected to improve the quality of the data that is stored in the data base.

11 Claims, 7 Drawing Sheets

FIG.2

|   | 100-11 | 100-12 | 100-13 | 100-14 |
|---|--------|--------|--------|--------|
| 1 | XYZ1   | XYZ1   | XYZ1   | XYZ-001 |
| 2 | YES    | YES    | NO     | NO     |
| 3 |        | OFF    | OFF    | 0      |
| 4 |        | 1500   | 5100   | 5100   |
| 5 |        | ON     | ON     | 1      |
| 6 |        |        |        | 73     |

| RECORDS = 1000 | CHANGE |
|---|---|
| PROCESS 2 = 2 | 0.2% |
| PROCESS 3 = 26 | 2.26% |
| PROCESS 4 = 175 | 17.5% |

DATA TRACKING ARRANGEMENT FOR IMPROVING THE QUALITY OF DATA STORED IN A DATABASE

TECHNICAL FIELD

The invention relates to databases and more particularly relates to improving the quality of the data that is stored in a database.

BACKGROUND OF THE INVENTION

Presently, a large number of businesses maintain one or more databases to support a variety of processes, such as processes involving the manufacture and delivery of products, or the provision of particular services. It goes without saying, then, that the data that are stored in a database needs to be accurate to ensure that the processes which rely on such data arrive at a correct result. For example, if the quality of data that are stored in a database supporting the manufacture and delivery of products is poor, then it is likely that an aspect of such manufacturing and/or delivery may also be poor.

Heretofore, the problem of maintaining the quality of data that is stored in a database has been dealt with by inspecting, in a conventional manner, the stored data and correcting errors as they are encountered. However, such an error correcting process is not only time-consuming, but is also very expensive. In addition, such an error correcting technique does not result in a sustainable improvement of the quality of data stored in a database, since the technique must be performed each time the stored data changes. Thus, despite its importance in the operation of a business, little attention has been directed toward improving and maintaining the quality of data that is stored in a database.

SUMMARY OF THE INVENTION

An advance in the art is achieved by providing a simple, inexpensive process which helps ensure the quality of data before it is entered in a database by tracking data records as they pass through various processes and determining which of the processes are corrupting one or more aspects of such data. In this way, processes which are not properly processing data may be identified and corrected to ensure that the data which is ultimately stored in a database is correct. Specifically, random samples of data records entering the first of a sequence of such processes are labeled and copies thereof are collected as each is outputted by one process to a next process. Accordingly, a series of copies of a particular data record that has been labeled is collected in which each such copy of the series may be associated with a particular one of the processes. Following such collection, the series is then examined using statistical methods to determine which processes have changed one or more fields of the sampled record and whether such changes possibly constitute errors. If the contents of a particular field of a copy of a sampled record is found to possibly contain an error, then conventional techniques are used to determine which one of the processes may be faulty. The faulty process may then be corrected to enhance the quality of its operation and, thus, the quality of data before the data is stored in an associated database.

BRIEF DESCRIPTION OF THE DRAWINGS

In the Drawing:

FIG. 2 is an illustrative example of copies of data records obtained from respective ones of the data processors of FIG. 1 and is useful for defining the operation of the tracking processor of FIG. 1, in accord with the invention;

FIG. 3 is an illustrative example of one result that may be obtained from analyzing copies of selected data records obtained from respective ones of the data processors of FIG. 1;

DETAILED DESCRIPTION

Tracking the quality of data will be discussed herein in the context of an information assembly process, which operates to assemble a data record from datum that may be received from one or more sources of data, and/or which operates to modify (update) one or more fields of an existing data record. Typically, a data record may be assembled over a number of steps involving different processes and involving different sources of data. Such a data source may be, for example, a manual data entry system, such as a keypunch operations, a computer terminal, electronic data transmission from another database system or some other form of data entry. In addition, one or more sources of data may, over time, supply particular data for the purpose of populating or modifying particular fields of an existing data record.

Figure 1:
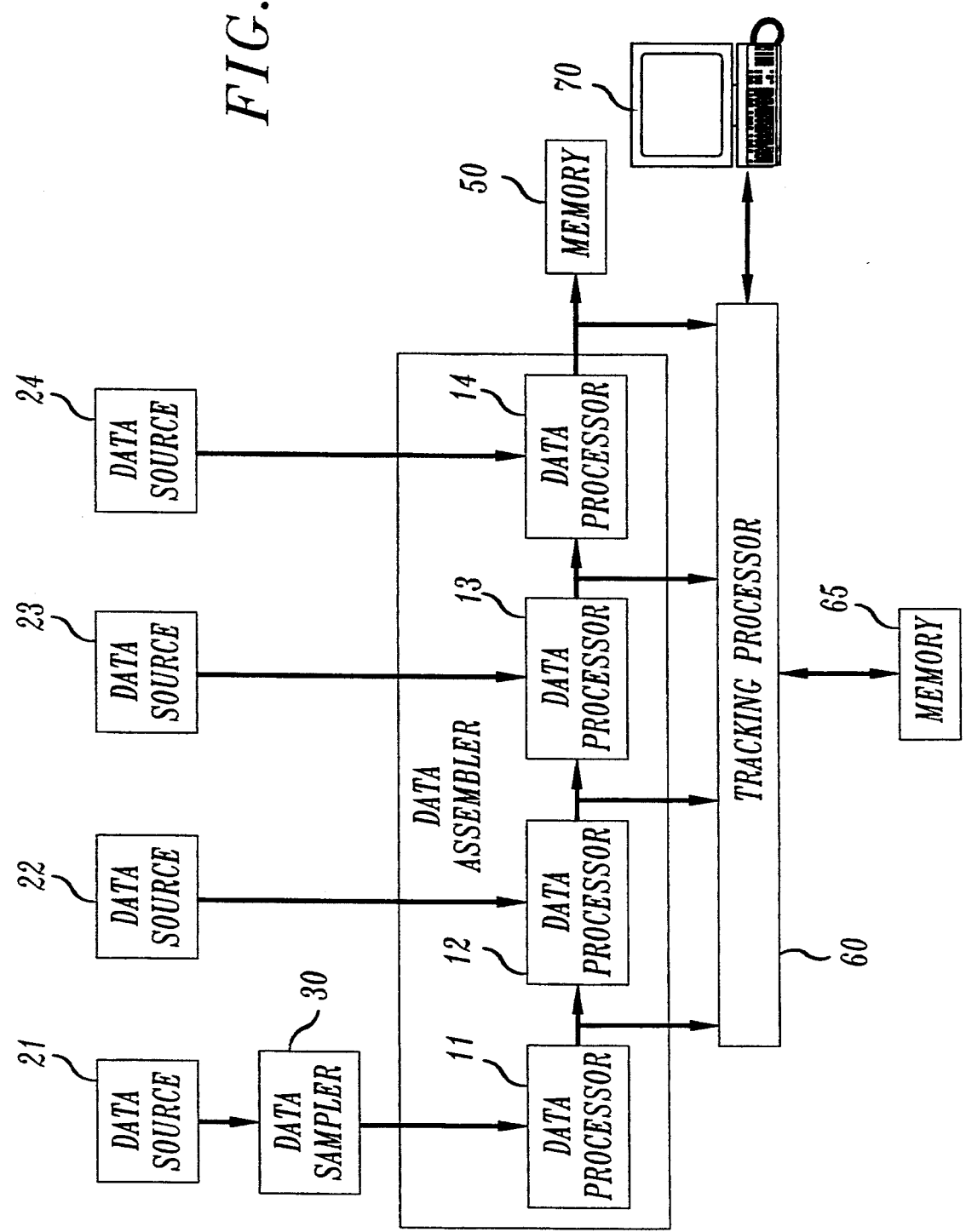
FIG. 1 is a broad block diagram of a data processing system in which the principles of the invention may be practiced.

An illustrative example of such a data assembler is shown in FIG. 1 and comprises a plurality of data processors. Four such data processors are shown in the FIG., namely, data processors 11 through 14, which operate to assemble or modify a data record using data supplied by respective ones of the data sources 21 through 24. The process of assembling a data record begins at data processor 11 using data supplied by associated data source 21 via data sampler 30. In particular, data processor 11 formats such data in accord with a predetermined format for insertion in the associated record and/or uses such data to modify the contents of the record. Data processor 11 then passes to data processor 12 the resulting data, and then begins processing the next data record, if any. Similarly, data processor 12 in response to the receipt of data from its associated source 22 formats such data accordingly for insertion in the received record and/or uses such data to modify the contents of the record. Data processor 12 then passes to data processor 13 the resulting record. Data processor 13, and then data processor 14, process the record in a similar manner using the data that they receive from their associated sources of data. When data processor 14 completes its process it then stores the data record in database memory 50.

Data sampler, or preprocessor 30, operates, in accord with an aspect of the invention, to label particular ones of the data records (both current and new records) that it passes to data processor 11. That is, on a random basis, data sampler 30 inserts in a record that it receives from data source 21 a label, in which the label may be, for example, a predetermined number. In an illustrative embodiment of the invention the number has a value of one. In this way a record may be tracked as it passes from one data processor to a next succeeding data processor. In addition, data sampler 30 appends to the labeled record two additional fields. Each data processor 11 through 14 is arranged, in accord with an aspect of the invention, to record in one appended field the date and/or time of day that it receives the associated labeled record and record in the other appended field the date and/or time of day that it passes to a next succeeding data processor or to database memory 50 the associated labeled record. As will be discussed hereinafter, the difference between such recorded times may be used to gauge whether a data processor performs its function within predetermined schedule.

(It is noted that in an illustrative embodiment of the invention, the aforementioned label and date and/or time fields are removed from a record before the record is stored in database memory 50.)

It is seen from FIG. 1, that when one data processor (e.g., processor 11) passes to a next data processor (e.g., processor 12) a labeled record a copy of the record is also passed to tracking processor 60. Tracking processor 60 thus receives a copy of a labeled record from each of the data processors 11 through 14 and stores each such copy in associated memory 65. Thereafter, tracking processor 60 compares copies of a labeled record that are received from adjacent data processors (e.g., data processors 11 and 12) to identify changes in the contents of one or more fields of the labeled record and flag those changes which might represent an error.

Such changes may be classified as being either normalization, translational, or spurious-operational changes. A normalizational change occurs as a result of inserting in or deleting from a record one or more so-called delimiters, spaces, etc., to meet a particular record formatting criteria that is designed in the record assembly process or in a record modification process. A translational change may occur as a result of one or more data processors using different software languages. This case may arise in the instance where different types of computers are used to implement data processors 11 through 14. For example, data processor 11 may be a software module in one type of computer, e.g., a personal or minicomputer, whereas data processor 12 through 14 may be software modules in a mainframe computer. A spurious-operational change occurs when a data processor changes the value of a data field. Typically, a spurious-operational change is indicative of a processing error in one of the data processor.

Turning now to FIG. 2, there is shown an illustrative example of copies 100-11, 100-12, 100-13 and 100-14 of a particular labeled record 100 that may be obtained from data processor 11 through 14, respectively. For the sake of clarity and brevity it is assumed that the record comprises six fields respectively designated 1 through 6. It can be seen from copy 100-11 that, as of result of processing the record, processor 11 had inserted in fields 1 and 2 the character strings "XYZ1 and "YES", respectively, and that processor 12 then inserted in fields 3, 4 and 5 a character string of "OFF", a value of 1500 and a character string of "NO", respectively. Upon comparing copy 100-12 with copy 100-13 tracking processor 60 would find that data processor 13 had changed the contents of field 2 to the character string "NO" and had changed the contents of field 4 to a value of "5100". Accordingly, tracking processor 60 would flag such changes and then go on to compare copy 100-13 with copy 100-14. In doing so, tracking processor 60 would find that data processor 14 had changed the contents of field 1 to "XYZ-001" and had changed the contents of fields 3 and 5 to 0 and 1, respectively. Similarly, tracking processor 60 would flag those changes. Tracking processor 60 would then store in memory 65 the results of its examination and then go on to examine copies of a next labeled record.

When the assembly and modification of records has as been completed and processor 60 has completed its examination of copies of the labeled records, a user may then enter in terminal 70 connected to processor 60 a command to display on terminal 70 the copies of those labeled records which have been flagged. Processor 60 responsive to receipt of the command would unload from memory 65 the copies of a first one of such labeled records, e.g., record 100, and display the copies on the display of terminal 70. In addition, processor 60 would "highlight" the fields that have been flagged. The user may then examine the contents of each of the displayed flagged fields to determine if a change represents a normalizational, translational or spurious-operational change, as defined above.

Upon examining field 1 of copy 100-14, the user would classify that change as a normalization change, since the value of 1 accompanying the character string "XYZ" may also be represented as −001. That is, the contents of field 1 of copy 100-14 is essentially correct, except for the fact that its representation has been formatted differently by processor 14. The user would classify (mark) the changes made to fields 3 and 5 of copy 100-14 as translational changes, since the character strings "OFF" and "ON" entered by data processor 12 may also be represented by binary values 0 and 1, respectively. Accordingly, the user would mark fields 1, 3 and 5 of copies 100-12 and 100-14 as containing translational and/or normalization errors. Although such changes do not represent errors, the user nevertheless may mark both of those copies as a notation to either modify data processor 12 or data processor 14 to ensure that the format of the data that is stored in database 50 is consistent with a desired formatting scheme.

Similarly, the user would go on to mark the changes in fields 2 and 4 of copy 100-13. However, in this case the user would evidently mark the changes as being spurious-operational errors. After the user has completed the examination of all such copies of labeled records, he or she may then enter via terminal 70 a command to display a quality control chart, or another statistically-based display, of one class of marked errors, for example, spurious-operational errors.

Processor 60 responsive to receipt of that command examines the copies of labeled records stored in memory 65 associated with respective ones of the data processors 11 through 14 and tabulates the number of fields that have been marked as being spurious-operational errors. Processor 65 then displays on the display of terminal 70 the number of labeled records represented by the examined copies and the result of each tabulation, an example of which is shown in FIG. 3.

In the FIG., data processors 11 through 14 would correspond with data processes 1 through 4, respectively. In addition, the values shown for the displayed data are assumed herein for illustrative purposes, in which the displayed data includes the number of spurious-operational errors accumulated between adjacent, or subsequent, processes and an associated error rate.

The error rate is based on the number of spurious-operational errors accumulated between adjacent processes in relation to the number of records (e.g., 1000) that have been sampled (labeled). It is apparent from the displayed information that the highest error rate occurs between processes 3 and 4. Accordingly, the user would most likely direct his/her attention toward determining the root cause for the 17.5 % error rate associated with the process 3-process 4 combination and then repair the root cause of the problem to decrease the error rate to a desired level. The user would then similarly direct his/her attention to the process 2-process 3 combination, which is assumed herein to have the second highest error rate, and then attend to process 1-process 2 combination and so on. Thus, the quality of the data that is stored in database 50 would automatically improve as the user improves the performance of each process, i.e., decreases the error rate of each process that is involved in the assembly or modification of a data record. Further, the improved quality levels may be sustained through continued use of data tracking and statistical quality control. Moreover, as the user proceeds in accord with the invention and drives the error rate of each data assembly process toward zero, then it is highly likely that the number of errors contained in database 50 will be also be driven toward zero.

As mentioned above, preprocessor 30 (FIG. 1) appends to each labeled record two date and time fields for tracking the processing time consumed by a data processor in processing a data record. The information that is inserted in those fields is also useful for tracking other aspects that might come into play in the processing of a data record. For example, such time tracking may be used to identify a delay in such processing or a delay in delivering to one such processor a data record and/or associated data, thereby helping to ensure the completeness and quality of a data record that is stored in a database, as discussed below.

Figure 4:
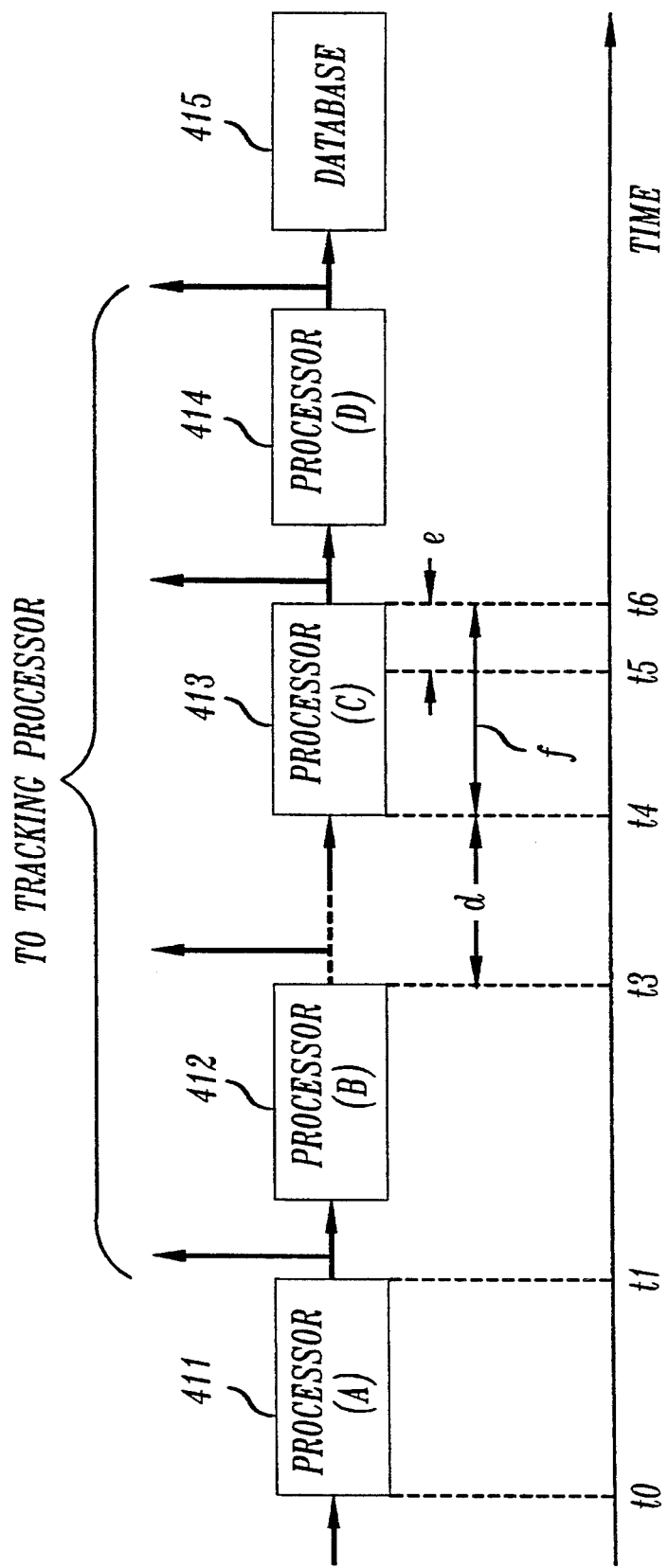
FIG. 4 is a broad block diagram of the data processors of FIG. 1 and is useful to illustrate the processing time that may be consumed by each of the processors in processing a data record.

Turning then to FIG. 4, there is shown processors 411 through 414 and database 415. It is assumed that processors 411 through 414, like processors 11 through 14, perform respective functions in the assembly/modification of a data record received at the input of processor 411. The particular function that a processor, e.g., processor 411, performs is identified in the FIG. by an associated letter, e.g., "A". Similarly, each processor is arranged to supply to a tracking processor (not shown) a copy of each labeled record that the processor has processed. In addition, each such processor inserts in an associated labeled record information that may be used to quantify the amount of processing time that the processor consumes to process the record. Herein, such processing time is quantified by arranging a processor, e.g., processor 411, to enter in one date and time field the date and time (e.g., t0) that it receives a labeled data record and to enter in the other such field the date and time (e.g., t1) that it completes the processing of that record.

In the following discussion, attention is first directed to a so-called Queue time of a labeled record, which is represented in the FIG. by "d" and which is defined herein as being that duration of time that is spent when no work is being performed on an uncompleted labeled record. Queue time is important from the standpoint in that it "flags" an opportunity to "speed up" the entire process, in which the overall process may be, for example, a manufacturing process commonly referred to as Just-In-Time manufacturing. Queue time "d" is calculated by taking the difference between the date and time (e.g., t4) that processor 413 begins its work on a labeled record and the date and time (e.g., t3) that processor 412 completed work on that record. If the Queue time "d" of that record and other such labeled records is shown to be inordinately long, and possibly affecting the overall processing time of the record and possibly the actual process represented by the record, then the underlying cause for the Queue time "d" may be readily identified and repaired.

Another duration of time that is of particular interest is processor timeliness. Processor timeliness is calculated herein by taking the difference between the date and time (e.g., t5) that is allotted to a processor, e.g., processor 413, to complete its processing operation and the date and time (e.g., t6) that the processor actually does so. If a comparison shows a minor difference between the two times, t6 and t5 (shown in the FIG. as "e"), then it may be concluded that the associated process is operating on schedule. If, on the other hand, the comparison shows a significant difference between the two times, then it may be concluded that the associated processor, e.g., processor 413, is not operating on schedule.

The difference between processing times t6 and t4 is defined herein as "Value-Added" time (shown in FIG. as "f"). Excessive Value-Added time may be used to indicate that the associated processor is not operating efficiently.

Thus, the overall quality of the process of assembling/modifying data records may be enhanced by identifying and correcting not only "Queue time" but also "Value-Added" time and processor timeliness. In the present illustrative example, the "Value-Added" time associated with processor 413 may be decreased by directing attention to the way processor 413 processes a data record and correcting any problems contained therein.

Figure 5:
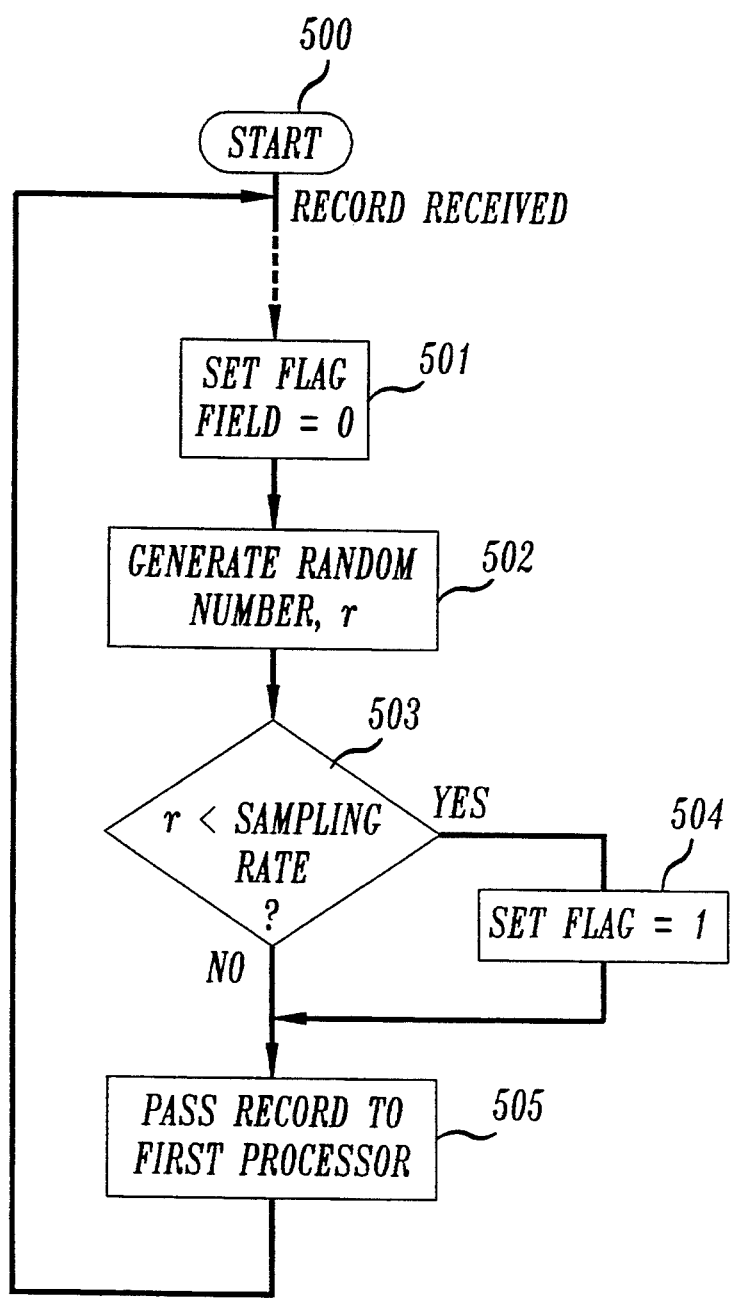
FIGS. 5-8 are flow charts of the program which implements the invention in a data processing system, illustratively the system of FIG. 1.

Turning now to a discussion of the software programs which implement the invention in the various processors, FIG. 5 shows in flow chart form the program which labels selected data records and which is implemented in data sampler 30. Specifically, the program entered at block 500 first waits and then proceeds to block 501 when it receives a data record from a source of data records, the source being, for example, data source 21. At block 501, the program initializes the label or flag field, e.g., sets the value of that field to zero. The program then proceeds to block 502 where it generates, in a conventional manner, a random number "r" that is uniformly distributed over the interval $0 \leq r \leq 1$. The program then proceeds to block 503.

At block 503, the program compares the value of the random number with the value of the sampling rate set by the user, e.g., a sampling of 15% (0.15). If the value of the random number is found to be less than the sampling rate, then the program proceeds to block 504 where it sets the contents of the label field to a one and then proceeds to block 505. Otherwise, the program proceeds directly to block 505. At block 505, the program passes the received record to the first data processor, e.g., data processor 11, and then returns to the input leg of block 501 to await receipt of the next data record.

Figure 6:
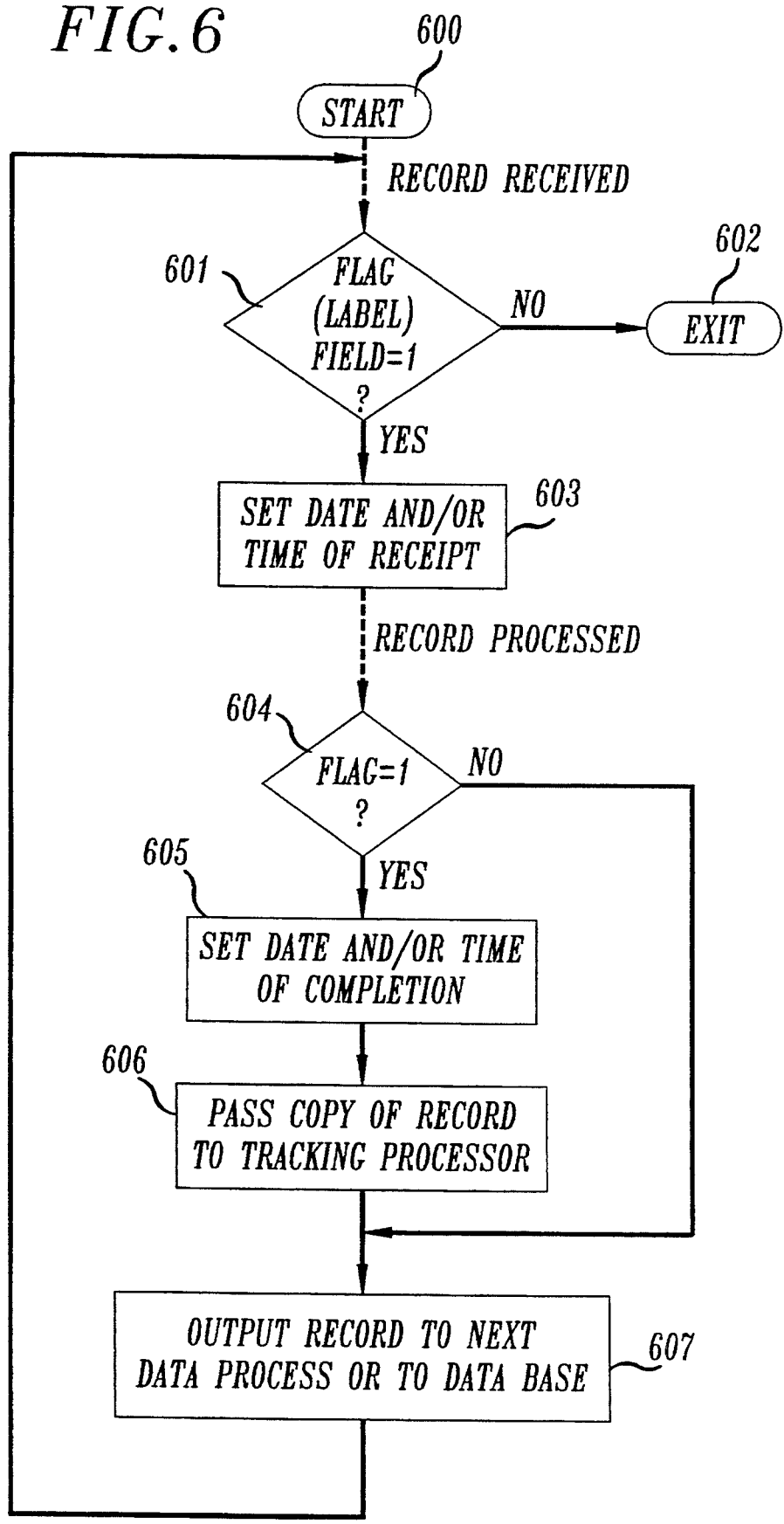

Turning next to FIG. 6, there is shown in flow chart form the program which implements the invention in a data processor, e.g., data processors 11 through 14. In particular, upon being entered at block 600, the program waits for receipt of a data record and proceeds to block 601 upon receipt thereof. At block 601, the program checks the label field and proceeds to block 603 if that field contains the value of one. Otherwise, the program exits via block 602 to process the received record. At block 603, the program enters in the first of the two date and time fields the current date and/or the current time. The program then exits to allow the associated data processor to process the received data record.

The program is then re-entered at block 604 when the associated data processor has completed the processing of the current data record. At block 604, the program checks the flag or label field of the current data record and proceeds to block 605 if that field contains the value of one. Otherwise, the program proceeds to block 607 where it outputs the current data record, in which the outputting of the data record may be to another data processor, the associated database or user terminal (not shown). The program then returns to the input leg to block 601 to await receipt of the next data record. At block 605, the program enters in the second of the two date and time fields the current date and/or the current time and then proceeds to block 606. At block 606, the program passes to the associated tracking processor (e.g., processor 60) a copy of the current data record. The program then proceeds to block 607.

Figure 7:
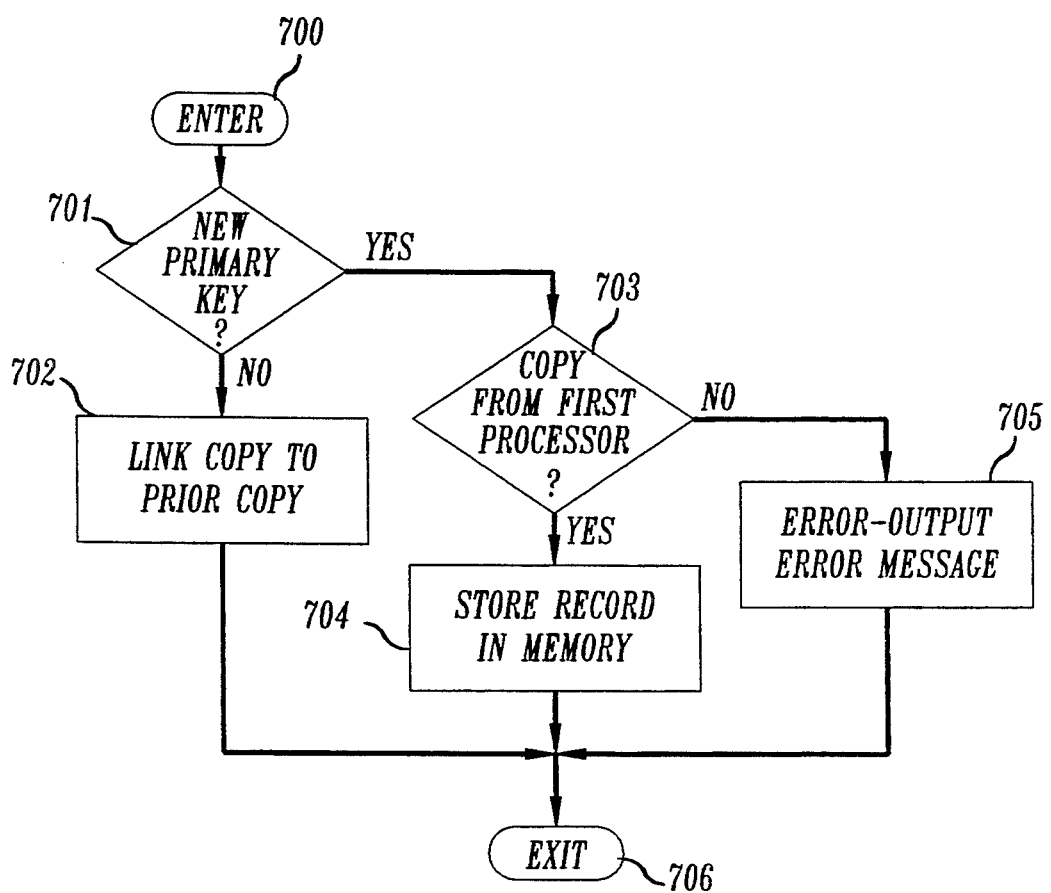

Turning next to FIG. 7, there is shown in flow chart form the tracking processor program that is invoked responsive to receipt from one of the data processors a copy of a labeled data record. In particular, entry of the program at block 700 causes it to proceed immediately to block 701. At block 701, the program checks the contents of a conventional primary key field contained in the record to see if a copy bearing that key has already been stored in memory, e.g., memory 65 (FIG. 1). (As is well-known the contents of the primary key field of a data record uniquely identifies the record.) If the program finds that a copy bearing the key of the newly arrived copy has been stored in memory, then the program proceeds to block 702. Otherwise, the program proceeds to block 703. At block 702, the program stores in memory in a conventional manner the newly arrived copy. That is, the program links the latter copy with the copy already stored in the memory. The program then exits via block 706.

At block 703, the program checks to see if the first processor, e.g., processor 11 (FIG. 1), is the sender of the newly arrived copy. If so, then the program proceeds to block 704. Otherwise, the program proceeds to block 705 where it outputs to a terminal, e.g., terminal 70 (FIG. 1), an appropriate error message including the identity of the sender and the newly arrived copy. The program then exits via block 706. At block 704, the program stores in its associated memory the copy newly received from the first processor. In addition, the program notes in a memory map the memory location at which the newly received copy is stored and the primary key associated with that copy. The program then exits via block 706.

Figure 8:
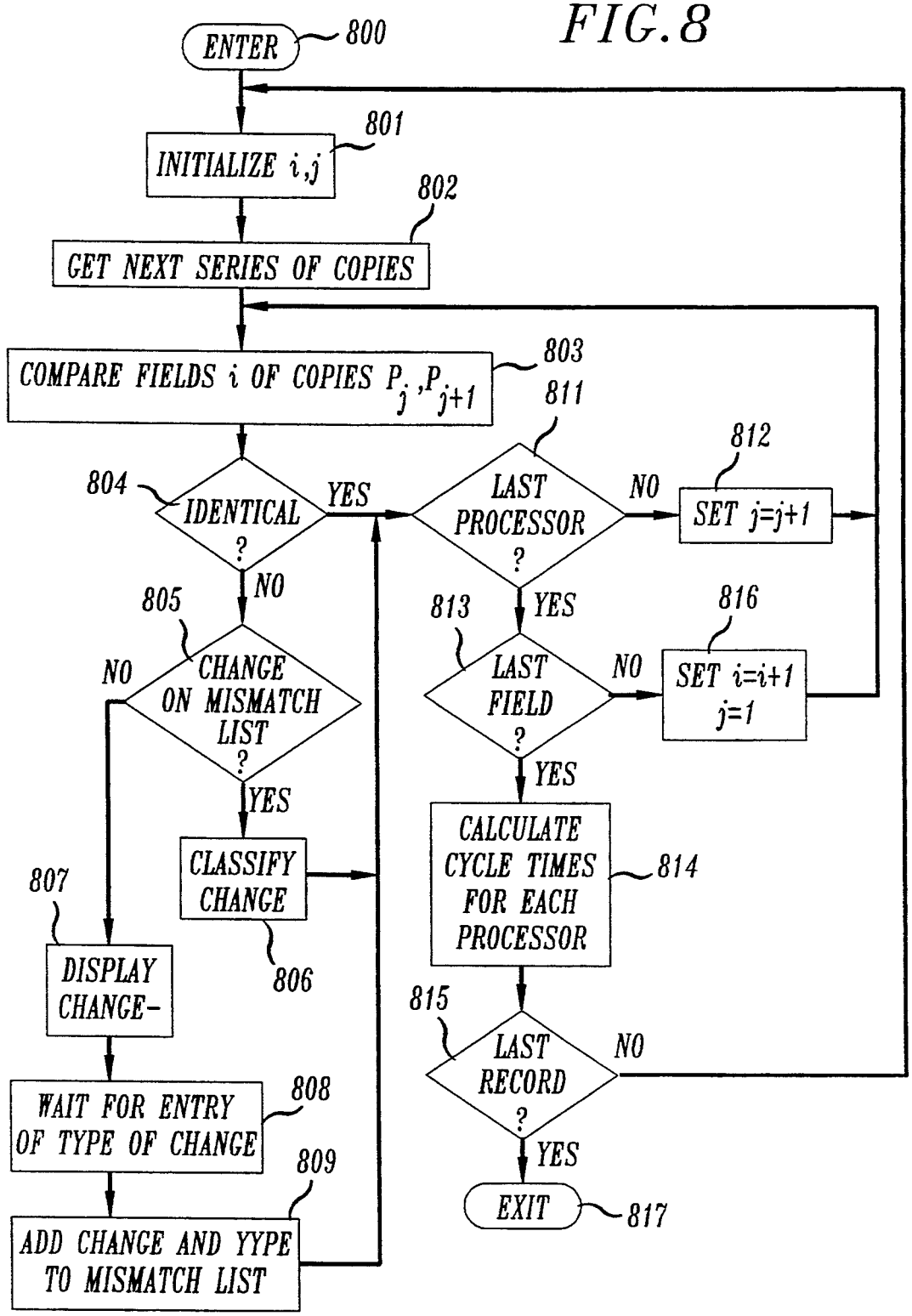

Turning next to FIG. 8, there is shown in flow chart form the program that is invoked in a tracking processor, e.g., processor 60, to compare the contents of the fields of one copy of a data record with the contents of the fields of an adjacent one of the copies. In particular, entry of the program at block 800 causes it to proceed to block 801 where the program initializes two variables, i and j to a predetermined value—illustratively the value of one. The program then proceeds to block 802 where it unloads from associated memory the first series of records to be stored therein. In doing so, the program makes use of the aforementioned memory map to determine the location at which is stored the first of the series. The program also makes use of the aforementioned linking to determine the location of the remaining copies of the series. The program then proceeds to block 803 where it compares the field$_i$ of the copy received from processor$_j$ with the field$_i$ of the copy received from processor$_{j+1}$. That is, the program compares the contents of the field$_i$ of adjacent copies (j and j+1). At block 804, the program proceeds to block 811 if the contents of those fields are identical. Otherwise, the program proceeds to block 805.

At block 805, the program checks a so-called mismatch list to determine if it contains the contents of one or more pairs of mismatched fields and proceeds to block 806 if it finds that to be the case. Otherwise, the program proceeds to block 807. At block 806, the program classifies, in accordance with the above definitions provided for normalization, translational, and spurious-operational changes, the mismatch, or change. The program then proceeds to block 811. At block 807, the program displays on the display of an associated terminal, e.g., terminal 70, the mismatch, or change, and then waits at block 808 for the attendant (analyst) positioned at that terminal to identify (input) the type of change characterized by the mismatch. Responsive to the entry of that information, the program proceeds to block 809 where it adds to the mismatch list the mismatch, or change, as well as the entered information. The program then proceeds to block 811.

At block 811, the program checks to see if the compare performed at blocks 802 and 803 involved the last and next-to-last processors, and proceeds to block 812 if it finds that to be the case. Otherwise, the program proceeds to block 813. At block 812, the program increments variable j by a value of one and then proceeds to block 802 to unload from memory the next series of copies.

At block 813, the program determines if it has completed comparing the last field of the last two copies of the data record and proceeds to block 814 if it finds that to be the case. Otherwise, the program proceeds to block 816. At block 814, the program, in the manner discussed above, calculates and stores in memory the Value Added time and Queuing time, and processor timeliness. The program then proceeds to block 815 where it determines if it has processed the last of such series and exits via block 817 if it finds that to be the case. Otherwise, the program proceeds to block 801 to process the next series of copies in the described manner.

At block 816, the program increments by the value of one the variable i and sets the value of variable j to a one. Then program then proceeds to block 803 to process the next field of the current series.

The foregoing is merely illustrative of the principles of the invention. Those skilled in the art will be able to devise numerous arrangements, which, although not explicitly shown or described heroin, nevertheless embody those principles that are within the spirit and scope of the invention.

We claim:

1. A method of processing data records, each of said data records being assembled by a plurality of data processors each for inserting data received from at least one source of data into particular fields of said data records, said method comprising the steps of labeling selected ones of said data records as said records are received from said source and supplying said data records in sequence to said data processors, said data processors processing each of said data records in sequence beginning with a first one of said processors, receiving from each of said data processors copies of said labeled data records as said labeled data records are processed by said data processors and forming said copies into respective series of copies associated with respective ones of said labeled records, and for each of said series of copies identifying as errors differences in the data inserted in corresponding fields of adjacent ones of said copies, and is determining, as a function of said errors, an error rate between the processors that processed said adjacent ones of said copies.

2. The method set forth in claim 1 wherein said errors include normalization, translational or spurious-operational errors, and wherein said error rate is based on spurious-operational errors.

3. A method of processing data records, each of said data records being assembled by a plurality of data processors each for inserting data received from at least one source of data into particular fields of said data records, said method comprising the steps of labeling selected ones of said data records as said records are received from said source and supplying said data records, in sequence to said data processors, said data processors processing each of said data records in sequence beginning with a first one said processors, receiving from each of said data processors copies of said labeled data records as said labeled data records are processed by said data processors and forming said copies into respective series of copies associated with respective ones of said labeled records, and for each of said series of copies identifying as errors differences in the data inserted in corresponding fields of adjacent ones of said copies, and determining, as a function of said errors, an error rate between the processors that processed said adjacent ones of said copies, and wherein said method further comprises the step of appending to each of said labeled data records a first field for entering at least a time of day that an associated labeled record is received by an individual one of said data processors and a second field for entering at least a time of day that said one data processor outputs to a next one of said data processors said associated labeled record.

4. The method set forth in claim 3 wherein said time of day entered in said first field includes at least an associated date and said time of day entered in said second field includes an associated date.

5. The method set forth in claim 4 wherein said step of appending includes the step of determining a processing time consumed by said one data processor to process said associated labeled data record as a function of the time entered in said first field and the time entered in said second field.

6. Apparatus for processing data records, each of said data records being assembled by a plurality of data processors each for inserting data into particular fields of said data records, said apparatus comprising:

preprocessor means for selecting on a random basis individual ones of said data records and for labeling each of said selected records and supplying said data records in turn to a first one of said data processors so that said records are processed by all of said processors in a predetermined order beginning with said first processor, and means for receiving from each of said data processors copies of said selected data records as said selected data records are processed by each of said data processors and for identifying any difference in the data inserted in corresponding fields of copies of the same labeled record received from respective ones of said processors, marking such difference as an error and associating said error with the data processors that caused that difference to occur.

7. The apparatus set forth in claim 6 wherein said means for identifying includes means for determining an error rate between the data processors that caused such difference.

8. The apparatus set forth in claim 6 wherein said error includes normalization, translational or spurious-operational errors, and wherein said error rate is based on spurious-operational errors.

9. Apparatus for processing data records, each of said data records being assembled by a plurality of dater processors each for inserting data into particular fields of said data records, said apparatus comprising:

preprocessor means for selecting on a random basis individual ones of said data records and for labeling each of said selected records and supplying said data records in turn to a first one of said data processors so that said records are processed by all of said processors in a predetermined order beginning with said first processor, and means for receiving from each of said data processors copies of said selected data records as said selected data records are processed by each of said data processors and for identifying any difference in the data inserted in corresponding fields of copies of the same labeled record received from respective ones of said processors, marking such difference as an error and associating said error with the data processors that caused that difference to occur, and wherein said apparatus further comprises means for appending to each of said selected data records a first field for entering at least a time of day that said selected records are received by one of said data processors and a second field for entering at least a time of day that said one data processor outputs each of said data records to a next one of said data processors.

10. The apparatus set forth in claim 9 wherein said time of day entered in said first field includes an associated date and said time of day entered in said second field includes an associated date.

11. The apparatus set forth in claim 10 wherein said means for identifying includes means for calculating a processing time consumed by said one data processor to process each of said selected data records as a function of the time of day entered in said first field and the time of day entered in said second field.

* * * * *